United States Patent
Gueugneau et al.

(10) Patent No.: US 9,987,811 B2
(45) Date of Patent: Jun. 5, 2018

(54) MOULD INSERT COMPRISING A HIGH-CONTRAST TEXTURE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Anthony Gueugneau, Clermont-Ferrand (FR); Stéphane Montzieux, Clermont Ferrand (FR); Etienne Blanchet, Clermont-Ferrand (FR); Romain Calvel, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days. days.

(21) Appl. No.: 15/322,562

(22) PCT Filed: Jun. 28, 2015

(86) PCT No.: PCT/IB2015/001067
§ 371 (c)(1),
(2) Date: Dec. 28, 2016

(87) PCT Pub. No.: WO2016/001732
PCT Pub. Date: Jan. 7, 2016

(65) Prior Publication Data
US 2017/0157870 A1    Jun. 8, 2017

(30) Foreign Application Priority Data

Jun. 30, 2014    (FR) ..................... 14 01467

(51) Int. Cl.
*B29D 30/06*    (2006.01)
(52) U.S. Cl.
CPC .. *B29D 30/0606* (2013.01); *B29D 2030/0612* (2013.01); *B29D 2030/0613* (2013.01); *B29D 2030/0616* (2013.01)
(58) Field of Classification Search
CPC ........ B29D 30/0606; B29D 2030/0612; B29D 2030/0613; B29D 2030/0616
See application file for complete search history.

(56) References Cited

U.S. PATENT DOCUMENTS 4,553,918 A    11/1985 Yoda et al.
4,598,747 A *   7/1986 Flechtner ................ B60C 11/12
                                                  152/209.23
(Continued)

FOREIGN PATENT DOCUMENTS

DE    10200705455    8/2008
EP    1063071        12/2000
(Continued)

*Primary Examiner* — James P Mackey
(74) *Attorney, Agent, or Firm* — Cozen O'Connor

(57) ABSTRACT

Lining element intended to be inserted into a mold for molding and vulcanizing a tire tread, the lining element comprising a body and inserts inserted into this body, at least some of the inserts comprising a pattern comprising a plurality of recessed or projecting elements, the pattern being formed as an integral part of the inserts.

14 Claims, 3 Drawing Sheets

(56) References Cited

U.S. PATENT DOCUMENTS

| | | | |
|---|---|---|---|
| 7,225,844 B2* | 6/2007 | Lagnier | B29D 30/0606 152/209.21 |
| 9,196,818 B2* | 11/2015 | Yamane | H03H 9/0222 |
| 2002/0139164 A1* | 10/2002 | Ishihara | B21D 37/20 72/326 |
| 2005/0109438 A1* | 5/2005 | Collette | B29D 30/0606 152/209.18 |
| 2007/0095447 A1* | 5/2007 | Nguyen | B60C 11/12 152/209.18 |
| 2008/0283169 A1 | 11/2008 | Sato et al. | |
| 2009/0159167 A1* | 6/2009 | Scheuren | B29D 30/0606 152/209.18 |
| 2012/0055601 A1* | 3/2012 | Christenbury | B60C 11/12 152/209.18 |
| 2012/0161348 A1* | 6/2012 | Jenkins | B29D 30/0606 264/36.14 |
| 2012/0227879 A1* | 9/2012 | Muhlhoff | B60C 13/001 152/151 |
| 2013/0118660 A1* | 5/2013 | Gay | B29C 33/424 152/209.1 |
| 2015/0251367 A1* | 9/2015 | Cocural | B29D 30/0606 264/219 |

FOREIGN PATENT DOCUMENTS

| | | |
|---|---|---|
| FR | 2939714 | 6/2010 |
| GB | 588170 | 5/1947 |
| JP | 11-179730 | * 7/1999 |
| WO | WO2007/045425 | 4/2007 |
| WO | WO2009/007790 | 1/2009 |
| WO | WO2010/076502 | 7/2010 |
| WO | WO2012/171802 | 12/2012 |

* cited by examiner

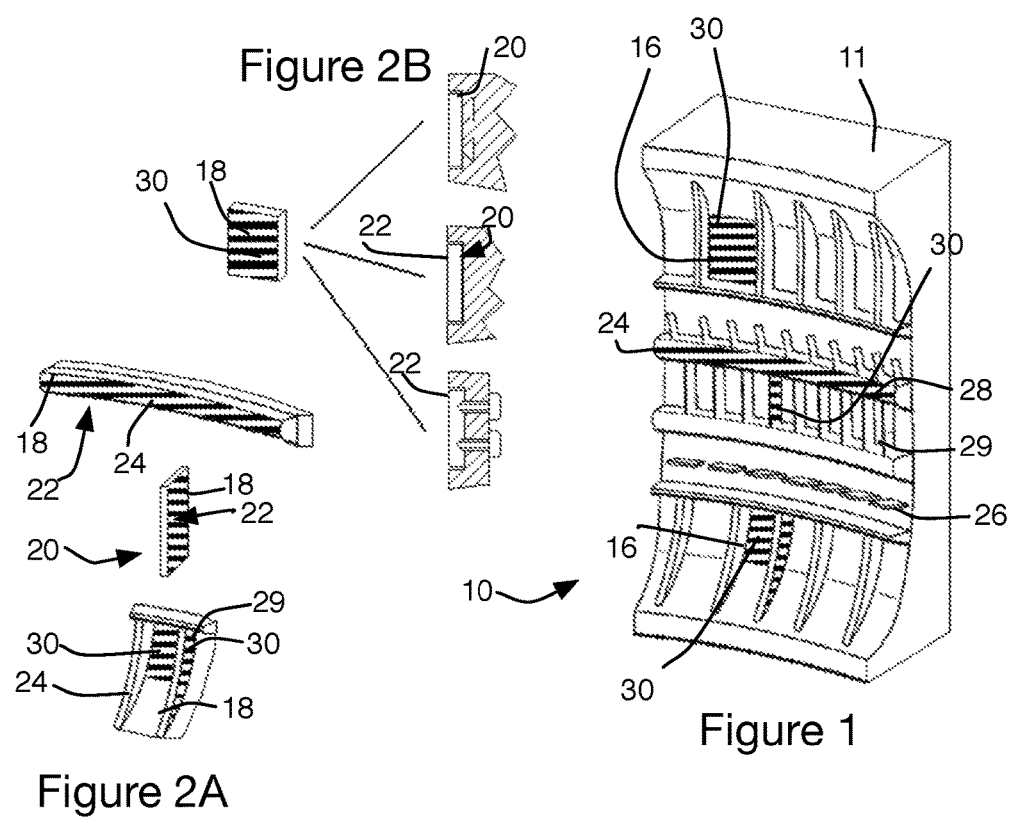

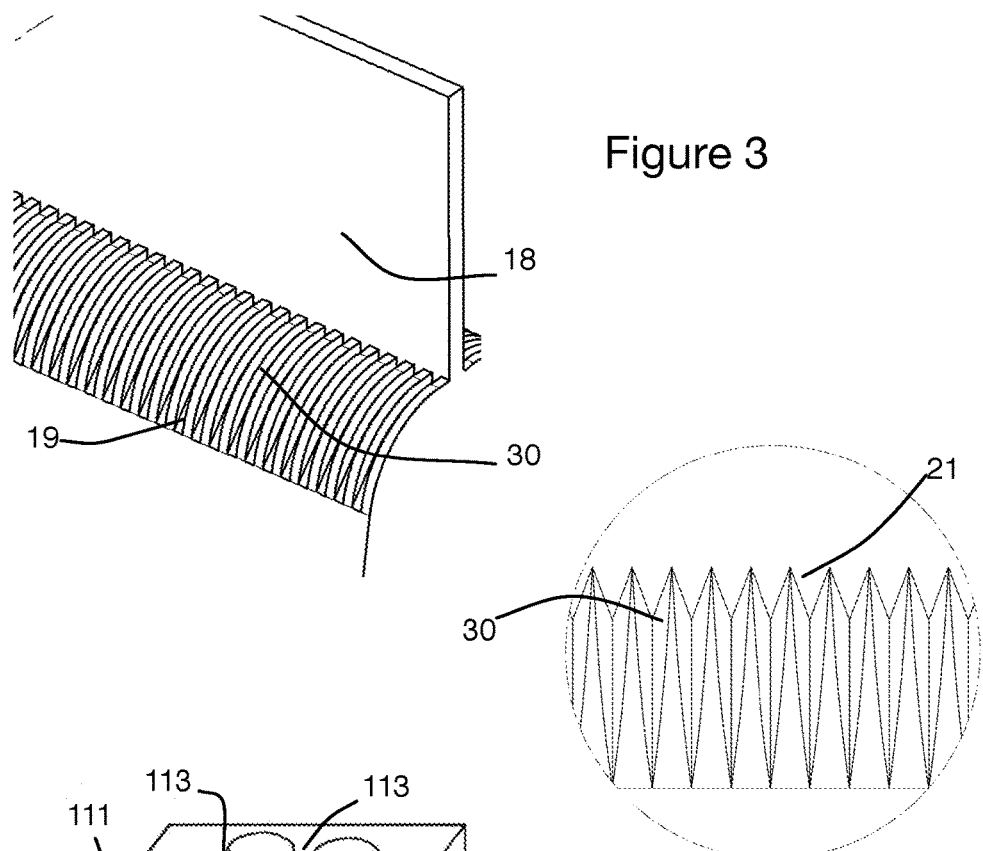
Figure 3
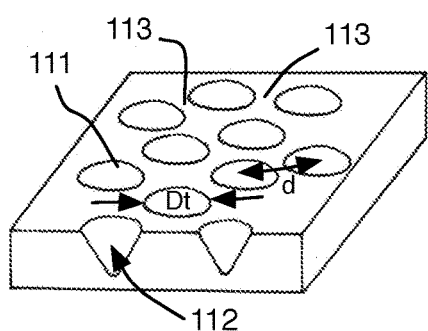
Figure 4
Figure 5
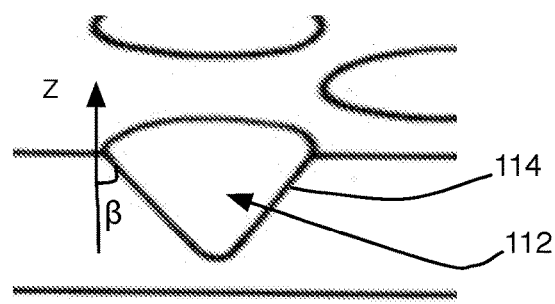
Figure 6

MOULD INSERT COMPRISING A HIGH-CONTRAST TEXTURE

RELATED APPLICATIONS

This is a U.S. National Phase Application under 35 USC 371 of International Application PCT/IB2015/001067 filed on Jun. 28, 2015.

This application claims the priority of French application no. 14/01467 filed Jun. 30, 2014, the entire content of which is hereby incorporated by reference.

FIELD OF THE INVENTION

The present invention relates to a mould element for a tire comprising a bearing surface and, on the opposite side, a moulding surface intended to form the external surface of the said tire.

BACKGROUND OF THE INVENTION

The surface of tires supports a large quantity of markings intended on the one hand to provide technical information as to the quality of the tire, and on the other hand to allow the consumer to discern the make and origin of the product. As a general rule, these markings are obtained by raised patterns arranged on the surface of the tire and corresponding to recessed patterns made on the moulding surface. Vulcanizing moulds are usually made of metal with a very good surface-finish but the resulting, smooth and black external surface of the tire has the effect of reflecting light.

Document WO2007/045425 describes particular types of high-contrast texture on tires. These textures have the main effect of trapping incident light and, by absorbing light, of giving part of the tire a black and matt appearance. This absorption of light makes it possible to obtain a more intense black colour that forms a better contrast with the rest of the surface of the tire. The contrast is all the greater when the texture sits alongside bright surfaces on the tire.

The contrast obtained by this absorption of light produces an appreciable visual effect on the finish of the product, often likened to the visual appearance of velours. Now, obtaining textures that produce such an effect is still at the present time a technological challenge that has been resolved only in part. Specifically, the current methods are relatively expensive and tricky to implement, and only allow the production of certain types of pattern, at certain locations, generally those that are easy to access.

Patent application WO 2010/076502 proposes a lining assembly for a tire mould comprising a skin. The skin is delimited by a first and a second surface that are opposite surfaces, the first surface being intended to be in contact with a tire mould support block and a plurality of lining elements projecting from the second surface of the skin, these elements being intended to form tread patterns in part of a radially external surface of a tire. Such an assembly makes it possible to obtain conventional tread patterns such as those of the treads of conventional tires.

Application DE 102007005455 relates to a tire lateral wall mould casing. This casing comprises a pattern of projections and recesses intended for moulding the lateral wall of the tire. This pattern is obtained by laser etching or by impression into the mould. The pattern features on a part made of rubber, silicon or plastic. This mould makes it possible to obtain an annular insert in a recess in the lateral wall.

Application WO2009007790 describes a tire moulding device and method. The device comprises a mould provided with a moulding cavity the shape of which corresponds to the external part of the vulcanized tire, and a pair of axially opposed shells each having a working surface. The working surface is set out in an annular shape and is predisposed to operate on the lateral walls of a green tire that has yet to be vulcanized. The working surface also has an annular groove along its development. An annular insert is mounted removably in the annular groove and has a moulding face opposite to the moulding cavity which bears graphic markings intended to be imprinted onto the lateral wall of the tire.

There is at the present time a need for solutions that make it possible to produce tires provided with intense black textures with great flexibility and advantageous costs.

In order to alleviate these various disadvantages, the invention provides various technical means.

SUMMARY OF THE INVENTION

One object of the invention is to provide a moulding system or mould element that allows for use over a wide variety of tires and makes it possible to produce various types of pattern or texture.

Another object of the invention is to provide a moulding system or mould element that can be obtained at competitive cost and in competitive production lead time.

Yet another object of the invention is to provide a moulding system or mould element that makes available patterns with no restriction on position in the mould, making it possible to obtain on the tire particular textures on the surface of the tread, for example a velours-type texture, or a particular graphic marking.

Yet another object of the invention is to provide a moulding system or mould element that allows the configuration of a mould to be modified quickly and easily in order to produce a tire with one or more different textures.

In order to achieve this, one aspect of the invention is directed to a lining element intended to be inserted into a mould for moulding and vulcanizing a tire tread, the lining element comprising a body and inserts inserted into this body, at least some of the inserts comprising a pattern comprising a plurality of recessed or protruding elements, the said pattern being formed as an integral part of the inserts.

Such a lining element affords a very high level of flexibility in the configuration and evolution of the moulds, while at the same time allowing the same segments to be reused.

According to one advantageous embodiment, the lining element comprises a pattern which comprises an organized arrangement of a plurality of elements, all or some of these elements being the distribution of one and the same basic element.

Advantageously, according to an embodiment, the insert of the lining element is configured as a mould lining such as a bar, a sipe blade, or a plurality of bars and/or sipe blades. Such an architecture allows the tire texture to be moulded in a groove (corresponding to the bar of the insert) or a sipe (corresponding to a sipe blade of the insert) and affords an additional aesthetic aspect, for example a depth effect.

According to an advantageous embodiment, the depth of the recessed elements is less than or equal to 30% of the thickness of the insert or the height of the protrusions is less than or equal to 30% of the thickness of the insert, and, more preferably, the depth of the patterns is less than or equal to 15% of the thickness of the insert or the height of the protrusions is less than or equal to 15% of the thickness of the insert.

According to one advantageous embodiment, all or part of the pattern is formed by conical cavities distributed through the pattern with a density at least equal to one conical cavity per square millimeter ($mm^2$), each conical cavity having a mean cross section comprised between 0.0005 $mm^2$ and 1 $mm^2$.

As an alternative, all or part of the pattern is formed by substantially mutually parallel striations, the spacing of the striations in the pattern being at most equal to 0.5 mm, each striation having a mean width comprised between 0.02 mm and 0.5 mm.

According to yet another alternative form, all or part of the pattern forms recessed forms of parallelepipeds of side length (C) comprised between 0.05 mm and 0.5 mm, of height (Hp) comprised between 0.05 mm and 0.5 mm, the distance between two adjacent parallelepipeds in the texture being comprised between 0.05 mm and 0.5 mm.

Advantageously, the insert comprises elements that allow removable or irremovable attachment for example using adhesive bonding, screw-fastening or mechanical anchorage. Removal is advantageously of benefit in order to allow the tread pattern to be cleaned should it become soiled or in order to change the insert.

According to one advantageous embodiment, the thickness of the mould element is advantageously comprised between 0.25 and 10 mm (or even more) and more preferentially between 0.25 and 6 mm.

The addition of protruding patterns allows the insert to be stiffened. The recessed patterns do not weaken the insert because their relative thickness is very small.

According to yet another advantageous embodiment, the protruding elements form strands, the said strands being distributed through the pattern with a density at least equal to one strand per square millimeter ($mm^2$), each strand having a mean cross section S comprised between 0.0005 $mm^2$ and 1 $mm^2$.

As an alternative, the protruding elements form mutually parallel strips, the spacing of the strips in the pattern being at most equal to 0.5 mm, each strip having a mean width comprised between 0.02 mm and 0.5 mm.

According to yet another alternative form, all or some of the recessed patterns form parallelepipeds of side length (C) comprised between 0.05 mm and 0.5 mm, of height (Hp) comprised between 0.05 mm and 0.5 mm, the distance between two adjacent parallelepipeds in the texture being comprised between 0.05 mm and 0.5 mm.

According to another advantageous embodiment, the recessed or protruding elements have mutually variable shapes and distances between them.

According to yet another advantageous embodiment, the protruding elements form cones on the surface of the mould and the texture comprises a plurality of cones, the said cones being distributed through the texture at a density at least equal to one cone per square millimeter ($mm^2$), these cones having, on the surface of the mould, equivalent diameters (Dt) comprised between 0.03 mm and 1.2 mm.

The lining element according to the invention may be configured for moulding a tire sidewall region or alternatively for moulding a tire tread region.

Advantageously, the lining element is produced by laser sintering. Implementation is designed so that the inserts have a texture, likewise produced by laser sintering. Thus, the mould elements including the textures are advantageously produced by laser sintering, this method of manufacture affording the advantage of allowing the creation of very fine and/or very complex textures as described later on.

The inserts are advantageously intended to be inserted into a lining made mainly from aluminium.

Another aspect of the invention is directed to a segmented mould for vulcanizing tires, comprising a plurality of lining elements as described hereinabove.

BRIEF DESCRIPTION OF THE DRAWINGS

All the embodiment details are given in the description which follows which is supplemented by FIGS. 1 to 8, given solely by way of non-limiting examples and in which:

FIG. 1 is a perspective view of a first example of mould elements inserted on a support block of a mould according to the invention;

FIG. 2a is a perspective view of one example of mould elements according to the invention before they are attached to a segment;

FIG. 2b is a perspective view of another example of a mould element according to the invention before it is fixed to a segment, with three views in lateral section in order to illustrate examples of means for attaching the mould element onto a support;

FIG. 3 shows a mould element comprising a pattern formed of striations recessed into the mould;

FIG. 4 shows a mould element in which the striations of the pattern have a pyramid-like cross section;

FIG. 5 depicts a pattern comprising a plurality of holes;

FIG. 6 is an enlarged view of the pattern of FIG. 5;

DETAILED DESCRIPTION OF THE DRAWINGS

Figure 7:
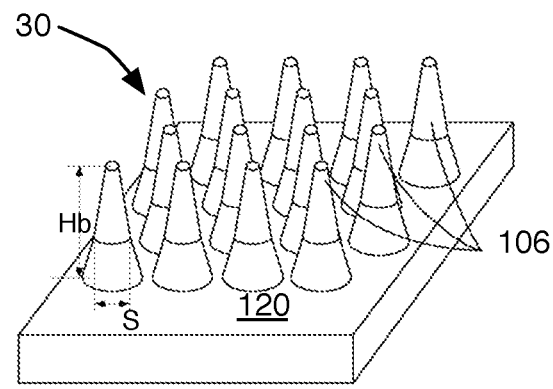
FIG. 7 shows a mould element comprising a pattern formed of strands protruding from the mould.

A "pattern" on a mould means an organized arrangement of a plurality of elements (striations, holes, strands, strips), all or some of these elements being a repeat of one and the same basic element, the pattern present on the mould making it possible to obtain a particular texture on a tire.

In the description which will follow, elements that are substantially identical or similar will be denoted by identical references.

FIG. 1 illustrates a lining element 10 of a segmented mould (not depicted) for vulcanizing tires. This lining element 10 comprises a body 11 advantageously made of aluminium alloy and notably comprising a plurality of support surfaces 16 intended to accept a plurality of inserts 18. The body 11 moreover comprises a network of tire tread pattern elements 24. Included among the tread pattern elements 24 there are notably sipe blades 26 which are intended to form circumferential slits in the tread of the tire or circumferential bars 28 which are intended to form a longitudinal groove in the tread of the tire. The various bars 28 may be connected by axial sipe blades 29 to form the network of tread pattern elements 24.

Each of the inserts 18 comprises a first 20 and a second 22 surface which are opposite surfaces, the first surface 20 being intended to be in contact with the support surface 16 of the lining element. The inserts are specifically designed to allow patterns 30 used to produce textures on the tires and which will be moulded with a mould provided with a plurality of bodies 11 to be incorporated into the body 11. For that, at least some of the inserts 18 comprise a pattern 30 which comprises a plurality of recessed or protruding elements, the said pattern being formed as an integral part of the inserts. In other words, each insert 18 including the patterns 30 is produced as a single piece.

The thickness of each insert 18 is comprised between 0.25 and 10 millimeters or even more.

As illustrated in FIGS. 1, 2A and 2B the inserts 18 may adopt various shapes according to the various alternative forms of embodiment. First of all, the inserts are advantageously produced in the form of inserts, as shown in FIG. 2B. These inserts are inserted on the support surfaces 16 of the body 11. The inserts may also adopt the form of axial sipe blades 29, as illustrated in FIG. 1 and in FIG. 2A. FIG. 1 finally illustrates another alternative form in which the inserts form portions of circumferential bars 28. These last two alternative forms make it possible to obtain sipe blades 29 and/or bars 28 that have patterns 30.

In these various alternative forms of embodiment, these patterns would be difficult to achieve if they had to be formed directly on the body 11.

In order to produce such an insert 18, the procedure advantageously involves selective laser sintering of a metallic powder. During manufacture of the insert, care is taken to ensure that the shape of the first surface 20 is the complement of the shape of the support surface 16 of the body 11 so that the insert 18 can engage correctly with the body.

FIG. 2a illustrates a number of exemplary embodiments of inserts 18 provided with textures 30 in the regions that will be visible following attachment to a body 11.

FIG. 2b shows an example of an insert 18 provided with a texture 30 with various examples of how to fix it to a support surface 16. The examples illustrated include a dovetail fastening, fixing using adhesive bonding or by screw-fastening. The dovetail corresponds to an anchorage when casting the aluminium alloy of the lining element.

In the examples such as those of FIGS. 1, 2a and 2b, the extent of the textured regions, the profiles and the positionings of the textured regions vary according to the embodiment, the examples illustrated being provided only by way of nonlimiting illustration. Furthermore, the patterns may adopt striated shapes, as depicted for example in FIG. 3, which shows square-wave striations 19, or in FIG. 4, which shows pyramid-shaped striations 21.

FIG. 5 illustrates the pattern according to a non-limiting first alternative form of the first embodiment. In this alternative form, the pattern is formed by a plurality of cavities 112. The cavities 112 here are in the shape of cones which extend into the depth of the mould and open onto the mould in the form of circular openings 111. The cavities 112 thus have a cross section which decreases into the depth of the mould. It will be noted that, in this alternative form, the openings 111 of the cavities 112 do not touch. The openings 111 are separated by intermediate regions 113. Furthermore, the openings 111 are evenly distributed across the mould so that the distance d between each opening of the pattern is roughly similar.

FIG. 6 is an enlarged view of the pattern of FIG. 5. All or some of the cavities here have at least one wall 114 which, when viewed in section, makes an angle β comprised between 10° and 60° with respect to a direction Z perpendicular to the pattern.

FIG. 7 illustrates an embodiment in which the pattern 30 comprises a plurality of strands 106, the strands 106 being distributed through the pattern with a density at least equal to one strand per $mm^2$, each strand having a mean cross section S comprised between 0.0005 $mm^2$ and 1 $mm^2$.

It will be noted that the mean cross section of each strand corresponds to the mean of the cross sections S measured at regular intervals from the base of the strand. The strands 106 have a conical overall shape with a cross section decreasing along the height Hb of these strands.

Figure 8:
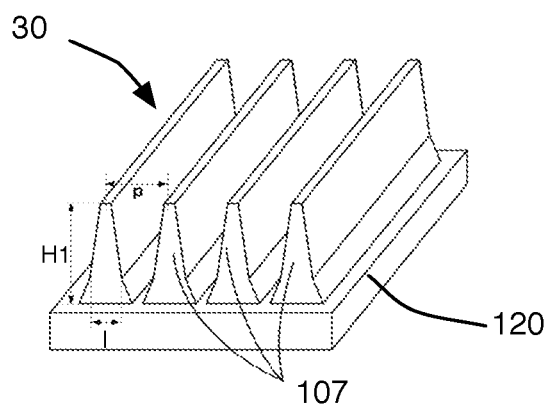
FIG. 8 shows a mould element comprising a pattern formed of strips.

FIG. 8 illustrates one embodiment in which the pattern 30 comprises a plurality of mutually parallel strips 107, the spacing of the strips 107 in the pattern 30 being at most equal to 0.5 mm, each strip 107 having a mean width comprised between 0.02 mm and 0.5 mm. It will be noted that the mean width corresponds to the mean of the widths 1 measured at regular intervals along the height Hl of the strip, the height of each strip being comprised between 0.05 and 0.5 mm.

In another alternative form of embodiment, the pattern comprises a combination of strands 106 and/or of strips 107.

The invention is not restricted to the examples described and depicted and various modifications can be made thereto without departing from its scope. Thus, according to another nonlimiting alternative form of embodiment, the strips 107 of FIG. 8 may be discontinuous. They have a planar part between them. They may further have differences in cross section from one another. In addition, the strips may have curvatures or corners, notably along their length. They may furthermore be of variable length.

Thus, according to another nonlimiting alternative form of embodiment, the cavities 112 may have a parallelepipedal cross section of side length C comprised between 0.05 mm and 0.5 mm, of height Hp comprised between 0.05 mm and 0.5 mm, the distance between two adjacent cavities in the texture being comprised between 0.05 mm and 0.5 mm. As an alternative, the cross section of the cavities may be circular, polygonal (for example hexagonal). With square or polygonal structures it is possible to organize the openings 111 more easily in relation to one another so as to limit the surface area of the intermediate regions 113 between these openings. With such shapes of opening it is possible more easily to achieve high levels of occupancy of the openings on the mould.

In the event that the inserts are removable, in order to adapt a mould to manufacture a new type of tire all that is required is for the inserts borne by the support blocks corresponding to the old type of tire manufactured to be removed, and for the new inserts 18 to be inserted in the corresponding surfaces 16, advantageously in a single operation.

In the event that the lining elements of a mould are manufactured as an aluminium casting, the inserts according to the invention are advantageously anchored during the casting in a plaster mould or a steel die. However, attachment by adhesive bonding or screw-fastening into a lining element made of aluminium or some other alloy may also be envisaged. In the former instance the inserts are not removable, whereas in the latter instance the inserts can be removed, either to allow them to be replaced or to allow them to be cleaned or the like.

The invention has been described in conjunction with a mould intended to incorporate a plurality of lining elements like the one illustrated in the example of FIG. 1. It may also be implemented in relation to a mould of some other type.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A lining element adapted to be inserted into a mould for moulding and vulcanizing a tire tread, the lining element comprising:
   a body; and
   inserts inserted into the body,
   wherein at least some of the inserts comprise a pattern comprising a plurality of recessed or protruding elements, said pattern being formed as an integral part of the inserts, and
   wherein on at least one of the inserts the plurality of recessed or protruding elements comprises square-wave shaped mutually parallel striations.

2. The lining element according to claim 1, wherein at least one of the inserts comprises a mould lining configured as a bar, a sipe blade, or a plurality of bars and/or sipe blades.

3. The lining element according to claim 1, wherein on at least one of the inserts, the plurality of recessed or protruding elements comprises a plurality of recessed elements and a plurality of protruding elements, and a depth of the recessed elements is less than or equal to 30% of a thickness of the insert or a height of the protruding elements is less than or equal to 30% of the thickness of the insert.

4. The lining element according to claim 1, wherein on at least one of the inserts, the plurality of recessed or protruding elements comprises a plurality of recessed elements and a plurality of protruding elements, and a depth of the recessed elements is less than or equal to 15% of a thickness of the insert or a height of the protruding elements is less than or equal to 15% of the thickness of the insert.

5. The lining element according to claim 1, wherein on at least one of the inserts, the plurality of recessed or protruding elements comprises a plurality of recessed elements formed by conical cavities distributed through the pattern with a density at least equal to one conical cavity per square millimeter ($mm^2$), each conical cavity having a mean cross section between 0.0005 $mm^2$ and 1 $mm^2$.

6. The lining element according to claim 1, wherein a spacing of the mutually parallel striations is at most equal to 0.5 mm, each striation having a mean width comprised between 0.02 mm and 0.5 mm.

7. The lining element according to claim 1, wherein on at least one of the inserts, the pattern comprises recessed parallelepipeds of a side length (C) between 0.05 mm and 0.5 mm, of a height (Hp) between 0.05 mm and 0.5 mm, and a distance between any two adjacent parallelepipeds is between 0.05 mm and 0.5 mm.

8. The lining element according to claim 1, wherein on at least one of the inserts, the plurality of recessed or protruding elements comprises a plurality of protruding elements forming strands, said strands being distributed through the pattern with a density at least equal to one strand per square millimeter ($mm^2$), each strand having a mean cross section S between 0.0005 $mm^2$ and 1 $mm^2$.

9. The lining element according to claim 1, wherein on at least one of the inserts, the plurality of recessed or protruding elements comprises a plurality of protruding elements forming mutually parallel strips, a spacing of the mutually parallel strips in the pattern being at most equal to 0.5 mm, each strip having a mean width between 0.02 mm and 0.5 mm.

10. The lining element according to claim 1, wherein the recessed or protruding elements have mutually variable shapes and distances between them.

11. The lining element according to claim 1, also configured for moulding a tire sidewall region.

12. The lining element according to claim 1, produced by laser sintering.

13. A segmented mould for vulcanizing tires, comprising a plurality of lining elements according to claim 1.

14. A lining element adapted to be inserted into a mould for moulding and vulcanizing a tire tread, the lining element comprising:
    a body; and
    inserts inserted into the body,
    wherein at least some of the inserts comprise a pattern comprising a plurality of recessed or protruding elements, said pattern being formed as an integral part of the inserts, and
    wherein on at least one of the inserts the plurality of recessed or protruding elements comprises pyramid-shaped mutually parallel striations.

* * * * *